April 16, 1963 R. M. DIETZ 3,085,370
COMBINED DRESSING TOOL AND WORK PIECE HOLDER
Filed Oct. 6, 1960 2 Sheets-Sheet 1

INVENTOR.
RICHARD M. DIETZ
BY Louis Necho
ATTORNEY.

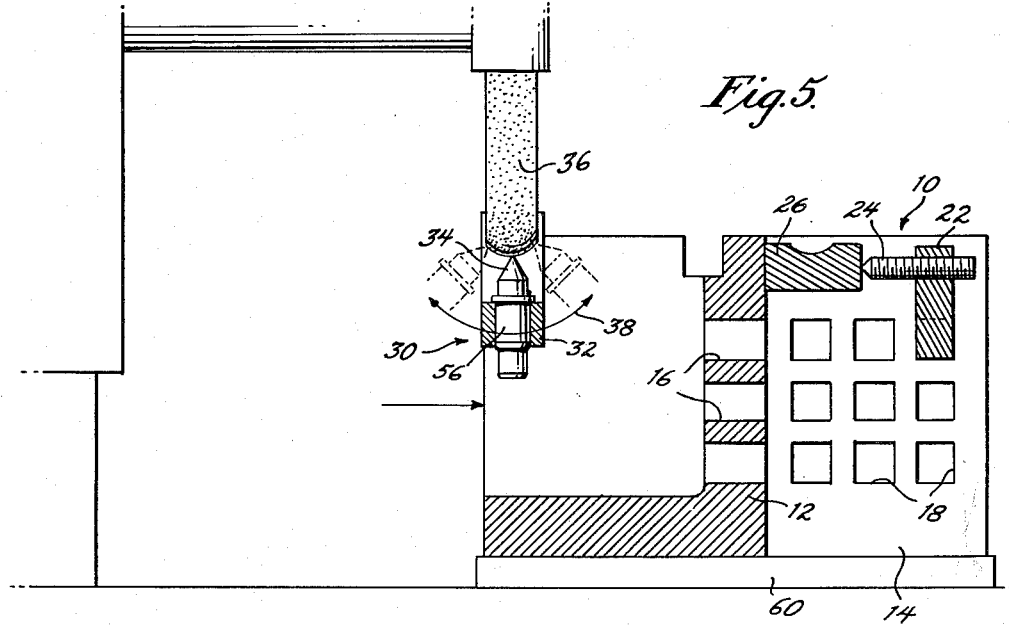
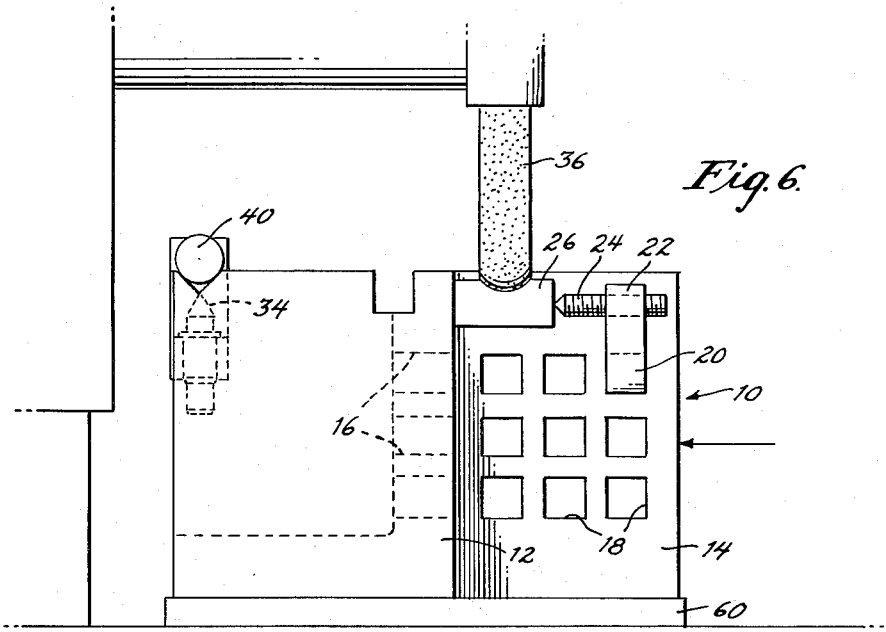
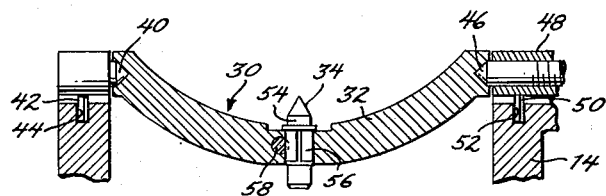
INVENTOR.
RICHARD M. DIETZ
ATTORNEY.

United States Patent Office 3,085,370
Patented Apr. 16, 1963

3,085,370
COMBINED DRESSING TOOL AND
WORK PIECE HOLDER
Richard M. Dietz, 200 Springfield Ave.,
Springfield, Pa.
Filed Oct. 6, 1960, Ser. No. 61,037
4 Claims. (Cl. 51—92)

This invention relates to a combined dressing tool and work piece holder for a surface grinding machine.

In the art of surface grinding, the grinding wheel must be dressed to the desired radius and the work piece must be presented to the wheel at exactly the desired angle. Dressing the grinding wheel requires an exact set-up which requires extreme skill and consumes considerable time. In the absence of extreme skill, the work produced will not be satisfactory. Furthermore, in many cases, the grinding wheel must be dressed and re-dressed before the grinding operation on a given work piece is completed. This means that the work piece must be removed, the dressing tool must be again set up, relative to the wheel, and after the grinding wheel has been dressed, the work piece must be re-set up with reference to the newly dressed grinding wheel. These repeated set-ups greatly increase the cost of the grinding operation and increase the opportunities for mistakes and inaccuracies to occur.

It is therefore the object of my invention to produce a combined dressing tool and work piece holder which, once set up, will be capable of presenting the dressing tool, or the work piece, to the grinding wheel with no need for repeated set-ups, or adjustments, other than lowering the wheel relative to the work, or raising the work relative to the wheel, to compensate for the wear on the complementary surface of the grinding wheel and of the work piece.

The full nature of the invention will be understood from the following specification and the accompanying drawings in which FIG. 1 is a perspective view of a combined dressing tool and work piece holder which embodies the invention and which will hereinafter be referred to as holder.

FIG. 4 is a vertical sectional view looking in the direction of line 4—4 on FIG. 2.

FIG. 5 is a vertical sectional view showing the position of the holder during the grinding operation.

Figure 1:
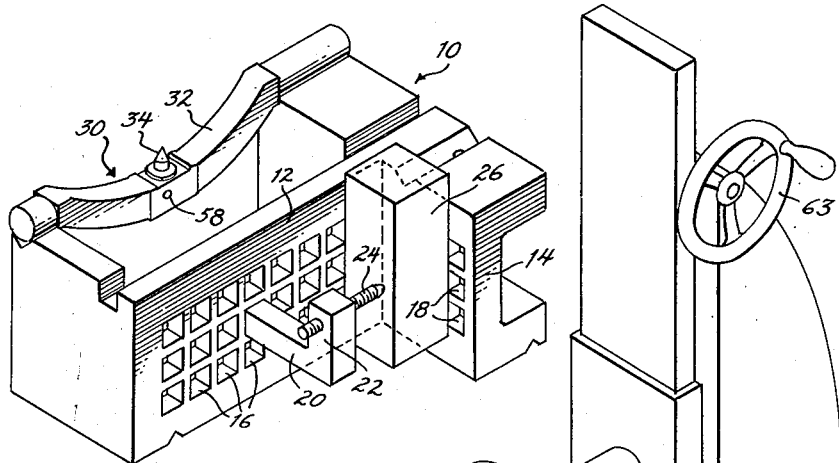
Figure 2:
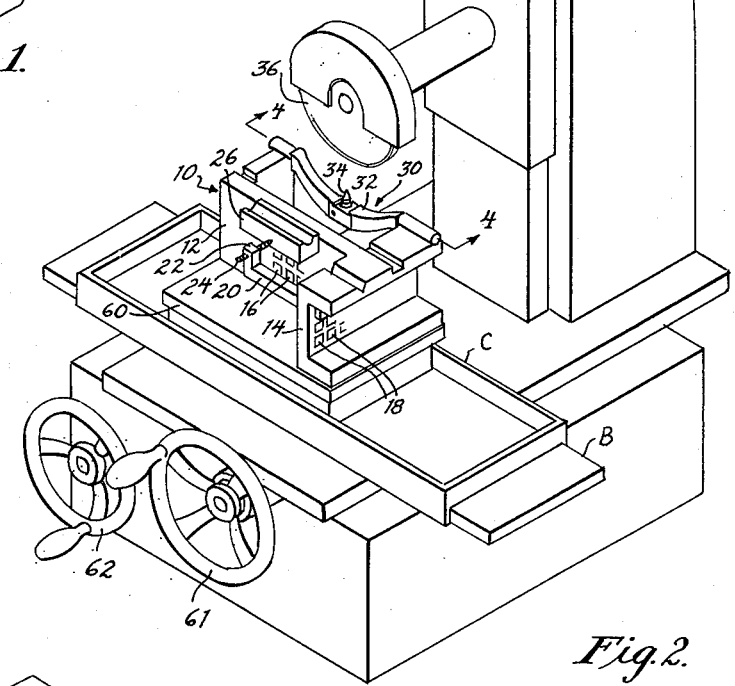
FIG. 2 is a diagrammatic, perspective view of a conventional surface grinder equipped with the holder of FIG. 1, but shown clamping a different work piece.
Figure 3:
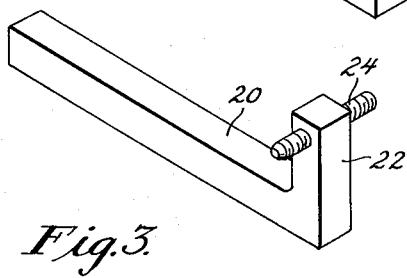
FIG. 3 is a perspective view of one of the clamping fingers used for clamping the work piece in position during the grind operation.

The machine illustrated in FIG. 2 includes a bed plate B which is movable fore and aft and from side to side by conventional gears which are activated by wheels 61 and 62, respectively, and to which the work piece is secured by conventional clamps, not shown. In the present case, the clamps are replaced by a magnetic chuck 60 which, when energized, "clamps" the work piece holding carriage C which is best shown in FIG. 1.

According to this invention, carriage C includes a work piece holding portion 10 and a dressing tool holding portion 30 which will be hereinafter referred to. Work piece holding portion 10 has smooth, and parallel top and bottom surfaces and includes angularly disposed walls 12 and 14 which have holes 16 and 18, respectively. Holes 16 and 18 are adapted to receive the shanks of clamping fingers 20, whose bent end portions 22 are tapped to receive studs 24 for clamping a workpiece 26 against wall 12 or wall 14, depending on whether fingers 20 are mounted in holes 16 or 18. By tilting the carriage, the work piece is presented to a grinding wheel, or other tool, at a corresponding plain angle and, by tilting the carriage and by mounting the work piece on a sine bar which is clamped to the carriage, the work piece can be presented to the wheel at a corresponding compound angle. For further information as to the work piece holder and its operation, see my Patent 2,995,962.

In order to be able to redress the grinding wheel during a grinding operation to the same angle, and without disturbing the set-up of the work piece, carriage C is provided with the previously mentioned adjustable dressing tool holding portion 30 which is best shown in FIGS. 1 and 4 and which includes an angularly adjustable arm 32 which carries a dressing tool, such as a diamond, 34, or the like. In the preferred embodiment, one end of arm 32 is provided with a conical recess for detachably, and rotatably, engaging conical bearing member 40 which is carried by a pin 42 which snugly engages hole 44 in block 10. The other end of the arm is also provided with a conical recess for engaging a conical bearing 46 which threadedly engages a sleeve 48 which is carried by a pin 50 which engages a hole 52 in block 10. By this arrangement, the arm can be mounted as shown in FIG. 1 by backing bearing member 46, or moving it to the right at viewed in FIGS. 1 and 4, to permit engagement of the opposite end of the arm with bearing member 40. Next, bearing 46 is moved to the left, as viewed in FIG. 1, until it engages conical bearing member 46. By the same token, arm 32 can be easily removed, and without dismantling any parts other than bearing 46. This permits the removal of arm 32 to a work bench where the diamond can be set up with the aid of gauges and other mechanical aids which expedite, and insure the accuracy of, the mounting of the dressing tool.

Diamond 34 is preferably carried by a stem 54 which is enclosed in a split-sleeve 56 which is adapted to be clamped on said stem by an eccentric screw 58. To raise, or to lower, the tool it is merely necessary to loosen set screw 58. By this arrangement, the diamond can be loosened (for raising or lowering, or replacement) without disturbing its set up relation relative to the grinding wheel. This is due to the fact that the movement, in clamping or releasing direction, of the diamond clamping sleeve is concentric to the axis of the diamond.

Conventionally, the chuck 60 is moved toward, and away from, the operator by turning wheel 61 and is moved from side to side by turning wheel 62. The grinding wheel is raised and lowered by turning wheel 63. Also, conventionally, dials, not shown, are associated with wheels 61, 62 and 63 whereby the position of the carriage C and the work piece carried thereby can be noted in linear and angular terms.

The operation is as follows:

To dress the grinding wheel, the carriage is moved to the position of FIG. 5, arm 32 is moved to, and clamped in, the desired angle relative to the grinding wheel, and the grinding wheel is lowered into contact with the dressing tool. Since the dressing tool is moved out of registration with the wheel during the grinding operation, by moving the carriage to the position shown in FIG. 6, the angular setting of arm 32 need not be disturbed, and if desired, the setting of the arm can be noted and recorded so as to insure accurate resetting thereof.

When the dressing operation is finished, the holder is moved to the position of FIG. 6 by turning wheels 61 and 62 and when the set-up is completed, the position of the work piece is noted from the dials associated with said wheels and recorded.

If it becomes necessary to redress the wheel, as is almost always the case, the carriage is moved back to the position of FIG. 5 and if the setting of arm 32 has not been disturbed, it is only necessary to lower the wheel to compensate for the wear which occurred during the previous grinding operation. If the setting of the arm was disturbed, it is merely necessary to reset it to the previously recorded position to insure that the wheel will be redressed to the exact profile it had when the grinding operation began. When it is desired to resume the grinding operation, the holder is moved back to the position of FIG. 6 and wheels 61 and 62 are turned until the associated dials show the previously recorded reading, thus insuring a continuation of the grinding operation under the same initial set-up.

It will be seen from the foregoing that by merely recording the angular position of the dressing tool at the initial dressing of the wheel, and by recording the initial set-up of the work piece relative to the tool, the wheel may be redressed to the exact profile, quickly, automatically and without any skill and without disturbing the set-up of the work piece whereby the grinding operation progresses as if there had been no interruptions. Indeed, except for noting the positions and re-establishing them after interruption, the operator need do nothing more than compensate for the wear on the wheel and the work piece by lowering the wheel, or by raising the dressing tool or the work piece, or both.

Since the grinding wheel can be moved up and down by turning wheel 63, it is entirely unnecessary to loosen arm 32 from any position to which it may have been set. Instead, dressing wheel can be raised high enough to permit the highest portions of the carrier to move thereunder from the position of FIG. 5 to the position of FIG. 6 and when the holder is in the position of FIG. 6, the grinding wheel will be lowered into engagement with the work piece, and so on. As above set forth, by noting the reading on the dials associated with wheels 61 and 62, the work piece can always be returned to the exact position in which it was at the start of the grinding operation, and since the position of the work piece relative to the holder is not changed, the set-up of the work piece is not disturbed. As to the dressing tool, once arm 32 has been adjusted to the desired angle, it can be clamped in that position for the duration of the particular grinding operation.

Since the grinding wheel is moved only up and down, either to permit the passage there-below of the holder, or to compensate for the wear on the wheel and the work piece, it follows that as long as conventional indicating devices, not shown, associated with wheel 63 show that the wheel has not yet reached the lowest predetermined point, the grinding operation is not complete and all that the operator has to do is to keep the wheel properly dressed and keep feeding it down until the proper indication has been reached.

What I claim is:

1. Apparatus comprising:
   a bed plate,
   a rotatable cutting tool, rotatable around an axis, and having a peripheral cutting surface,
   a carriage movably supported by said bed plate for adjustment along a path spaced from, but parallel to, the axis of said cutting tool,
   means for adjusting said carriage in opposite directions along said path,
   said carriage having a workpiece holding portion and a dressing tool holding portion,
   said workpiece and dressing tool holding portions being spaced from each other in the plane of said path,
   said carriage being adjustably movable along said path to bring said workpiece holding portion and said dressing tool holding portion alternatively into operative positions relative to said peripheral cutting surface,
   said dressing tool holding portion comprising a pair of oppositely disposed bearing members supported by said carriage in alignment with each other along a common axis transverse to said path,
   a dressing tool holding arm mounted for pivotal adjustment between said bearing members,
   said pivotal adjustments being provided by a recess in each end of said arm,
   a fixed pin in one of said bearing members engageable with the recess in one end of said arm,
   and an axially movable pin in the other of said bearing members,
   said movable pin being movable into and out of engagement with the recess in the opposite end of said arm, and
   a dressing tool mounted on said arm in a position to operatively engage said peripheral cutting surface of the cutting tool when said carriage is in its operative position relative to said peripheral cutting surface.

2. The apparatus of claim 1 wherein said dressing tool is releasably positioned on said arm,
   said dressing tool being axially adjustable in straight line movements toward and from the operative position wherein it is in engagement with the peripheral cutting surface of said tool.

3. The apparatus of claim 1 wherein said dressing tool is releasably embraced by a split sleeve on said arm,
   said split sleeve being operatively engageable by an eccentric screw,
   said screw being rotatable to alternatively clamp and release said sleeve around said dressing tool.

4. The apparatus of claim 1 wherein said cutting tool is a grinding wheel having an abrasive peripheral surface.

References Cited in the file of this patent
UNITED STATES PATENTS

| | | |
|---|---|---|
| 2,304,970 | Turner | Dec. 15, 1942 |
| 2,374,726 | Blazek | May 1, 1945 |
| 2,492,722 | White | Dec. 27, 1949 |
| 2,647,346 | Conradson | Aug. 4, 1953 |
| 2,792,823 | Muench | May 21, 1957 |
| 2,849,840 | Stoeckel | Sept. 2, 1958 |